United States Patent [19]

Sunaoshi et al.

[11] 4,427,894

[45] Jan. 24, 1984

[54] PORT SECTION STRUCTURE FOR MOUNTING REPLACEMENTS ON A SHIELDING BOX

[75] Inventors: Mitsugu Sunaoshi, Katsuta; Koichi Tokoro, Hitachi; Takeshi Natori, Ibaraki; Kojiro Yuki, Hitachi, all of Japan

[73] Assignee: Hitachi Cable, Ltd., Tokyo, Japan

[21] Appl. No.: 224,519

[22] PCT Filed: Jun. 20, 1980

[86] PCT No.: PCT/JP80/00139

§ 371 Date: Nov. 7, 1980

§ 102(e) Date: Nov. 7, 1980

[87] PCT Pub. No.: WO80/02890

PCT Pub. Date: Dec. 24, 1980

[30] Foreign Application Priority Data

Jun. 21, 1979 [JP] Japan ................................. 54-78582

[51] Int. Cl.³ ............................................. G21F 7/04
[52] U.S. Cl. .............................. 250/515.1; 250/516.1
[58] Field of Search ............... 250/506, 515, 516, 519; 29/402.02, 402.08

[56] References Cited

U.S. PATENT DOCUMENTS 3,475,808  11/1969  Woolsey ............................. 250/516

4,156,146  5/1979  Imai et al. ........................... 250/515

FOREIGN PATENT DOCUMENTS 52-121599  9/1977  Japan.

OTHER PUBLICATIONS

Hideo et al., "Glove Box Engineering Lectureship" Genshiryoku Kogyo, 18 (10), 10–1972, pp. 75–81.
Masatoshi, "High Radioactive Substance Handling Technique," Genshiryoku Kogyo, 12 (2), 2–1966.

Primary Examiner—Alfred E. Smith
Assistant Examiner—Carolyn E. Fields
Attorney, Agent, or Firm—Wenderoth, Lind & Ponack

[57] ABSTRACT

An improved structure of a section for mounting a replacement such as a filter, glove, bag or the like on a wall of a shielding box in which a material such as a radioactive or other hazardous material or the like, and/or an apparatus impossible of direct contact with a hand are disposed. The mounting section comprises a cylindrical fixed port secured to the wall, and a cylindrical replacement port having the replacement and adapted to be fitted into the fixed port. A plurality of rubber or the like elastic rings spaced from each other in an axial direction are sealingly disposed in a compressively deformed state between the two ports. Thus, renewal can be achieved by pushing out a spent replacement port with another, as needed.

4 Claims, 14 Drawing Figures

FIG. 11(a)  FIG. 11(b)  FIG. 11(c)
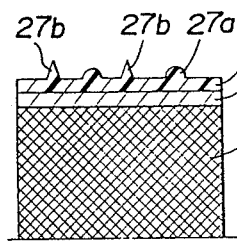 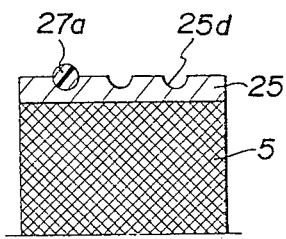 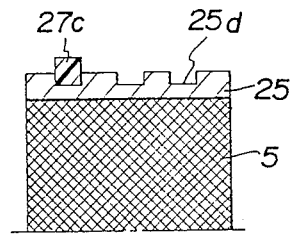
FIG. 11(d)
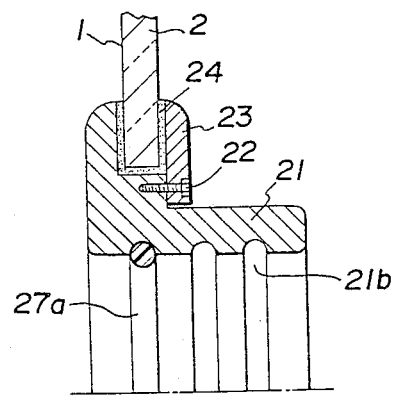

PORT SECTION STRUCTURE FOR MOUNTING REPLACEMENTS ON A SHIELDING BOX

TECHNICAL FIELD

The present invention relates to a structure of a port section for mounting a replacement such as a filter, glove, bag or the like on the wall of a box for shielding the dangerous atmosphere in which an indirectly handled radioactive or other hazardous material and/or an indirectly manipulated apparatus are present. In order to safely carry out renewal of the replacement without the conventional large-sized, complicated replacer, a plurality of elastic rings are disposed between a fixed port and a replacement port. The renewal can be easily achieved only by applying a pushing force to the replacement port in an axial direction thereof.

BACKGROUND ART

When a radioactive or other hazardous material is handled, or a certain apparatus is manipulated in a hazardous atmosphere containing such material, such a material and/or apparatus must be placed in a shielding box and must be indirectly handled or manipulated from the outside of the box.

As shown in FIG. 1, this shielding box 1 is made of a transparent material for observing the state of things within the box. The shielding box 1 is provided with gloves 3 and bags 4 on its side wall 2, and has an air supply filter 5a and exhaust filters 5b on its lower and upper walls, respectively. The gloves 3 are used for indirectly handling the radioactive material or for manipulating the apparatus by the operator's hands. The bags 4 are employed for removing spent articles from or for inserting necessary articles into the box 1. The air supply filter 5a is used for introducing fresh air into the shielding box 1. One of the exhaust filters 5b is employed for cleaning the polluted air and for discharging the cleaned air out of the box 1, and it is connected to the shielding box 1 at one end thereof and to an exhaust duct 7 at the other end thereof, each such connection being through a connecting pipe 6b having a polyvinyl chloride tube 6a.

FIG. 2 shows a conventional port section for replacing an old glove with a new one which is one of the replacements in the shielding box 1 described above. As shown in FIG. 2, a fixed port 21 having an opening 21a communicated with the outside in its central portion is secured to the side wall 2 of the box 1 through an U-shaped packing 24, by a ring-shaped, plate member 23 adapted to be tightened by a bolt 22. Into the opening 21a of the fixed port 21 is sealingly fitted a port to be replaced or replacement port 25. The fixed port 21 having a threaded portion 26 on its inner periphery is threadingly engaged with a glove replacement port 25 by compressively deforming an elastic screw member 27 adhered to the outer periphery of a larger cylindrical part 25a of the port 25 which will be hereinafter described. The replacement port 25 comprises two cylindrical parts 25a and 25b, the former being larger than the latter in diameter. The larger cylindrical part 25a of the replacement port 25 is provided with a pin 29 on its rear end surface and a hole corresponding to the pin 29 on the front end surface thereof. Over the smaller diameter cylindrical part 25b is tightly mounted a base 3a of the glove 3 by means of sealing band 30 and an O-ring 31. In back of this replacement port 25, another new glove replacement port 25 having the same construction as the former port is standing ready in a situation that a new glove 3 is sealingly fixed to the latter port 25 (the same reference numerals designate an identical part, so that the repeated description thereof is omitted).

In operation of replacing the old glove 3 with a new one, first the old replacement port 25 screwed into the fixed port 21 is brought into contact with the new replacement port 25 having a new glove 3 by inserting the pin 29 into a hole 28 of the latter port 25 for combining the two ports 25. Then, the combined replacement ports 25 are simultaneously pushed forward while subjecting to a rotational torque by an extruder (not shown) arranged behind the new replacement port 25. Therefore, when the new replacement port 25 reaches a predetermined position, the old replacement port 25 is automatically dropped into the shielding box 1, thereby achieving renewal of the port 25, and hence glove 3.

FIGS. 3 and 4 show the constructions in which a replacement bag 4 and a replacement filter 5 are sealingly fixed to the replacement port 25 elastically screwed into the fixed port 21, respectively. In these examples, renewals of the bag 4 and the filter 5 are carried out in a manner similar to that of replacement of the glove as shown in FIG. 2.

The structure of the replacement port section in the shielding box 1 described above is disclosed, for example, in U.S. Pat. No. 4,156,146 and Japanese Patent Disclosure No. 149597/77.

However, according to the structure of the replacement port section of the conventional shielding port 1, for the purpose of renewal of the replacement such as the glove, bag or filter fixed to the replacement port 25, a great rotational torque must be applied to the replacement port 25 by means of a large-sized, complicated extruder because of the very tight engagement of the fixed port 25 with the replacement port 21 through the threaded portion 26 and the elastic screw member 27.

In view of the above-mentioned features, the present invention provides an improved structure of a port section for mounting a replacement on the shielding box. According to this structure, a plurality of elastic rings in a compressively deformed state are arranged between a fixed port and a replacement can be safely carried out only by applying a pushing force to the replacement port in an axial direction thereof, without applying a rotational torque to the port.

SUMMARY OF THE INVENTION

That is, the structure of a port section for mounting a replacement on the wall of a shielding box according to the present invention comprises:
  a fixed port sealingly secured to the wall of the shielding box and having an opening communicating with the interior of the shielding box;
  a replacement port disposed with the opening;
  a replacement secured to the replacement port; and
  a plurality of elastic rings spaced from each other in an axial direction thereof and adapted to be disposed in a compressively deformed state between both ports for sealingly supporting the replacement port within said opening, thereby enabling renewal of the replacement secured to the replacement port only by applying an pushing force to the replacement port in an axial direction thereof.

BRIEF DESCRIPTION OF THE DRAWINGS

FIGS. 11(a)-11(d) are longitudinal sectional views, each illustrating the principal parts of the replacement and fixed ports in another preferred embodiment according to the present invention.

DETAILED DESCRIPTION OF THE INVENTION

Figure 1:
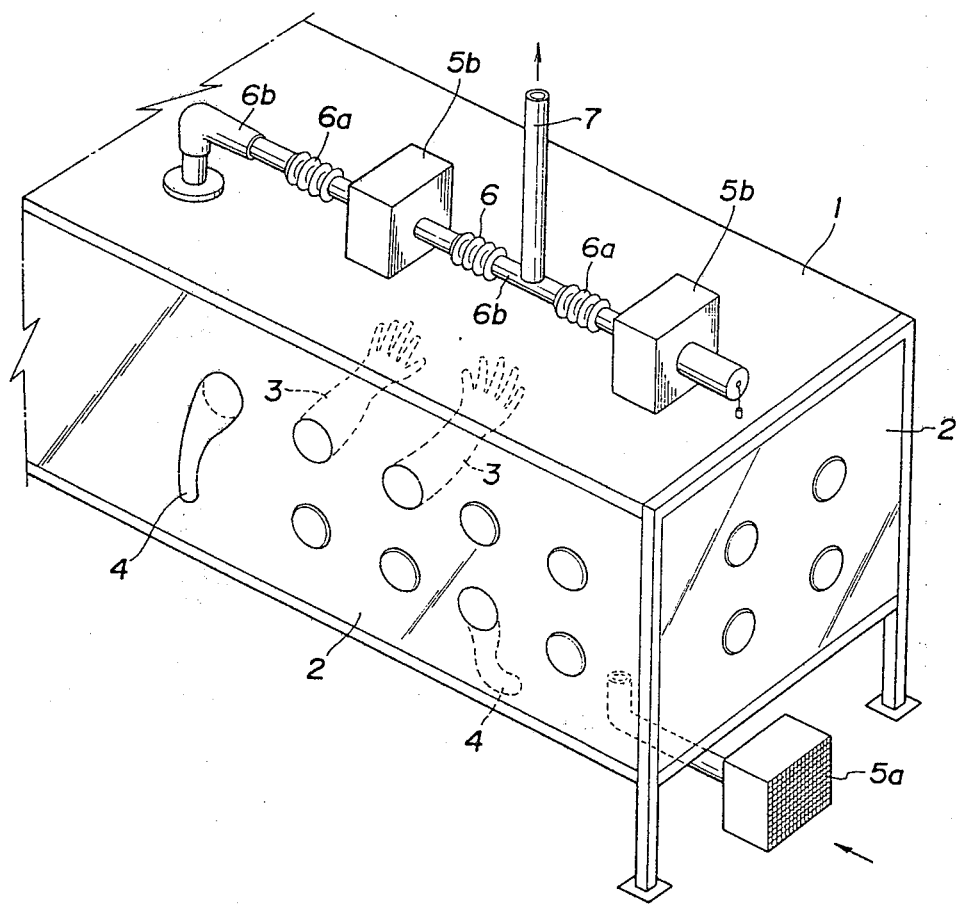
FIG. 1 is a perspective view of a conventional shielding box.
Figure 2:
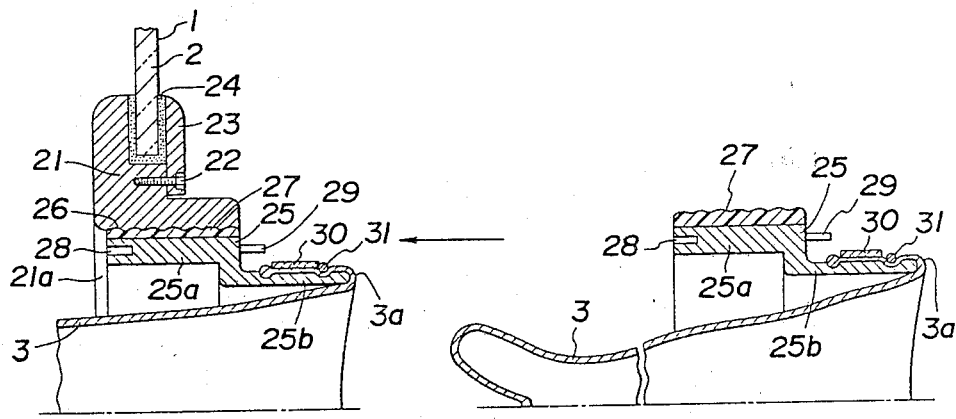
FIGS. 2-4 are longitudinal sectional views of conventional replacement port sections.
Figure 3:
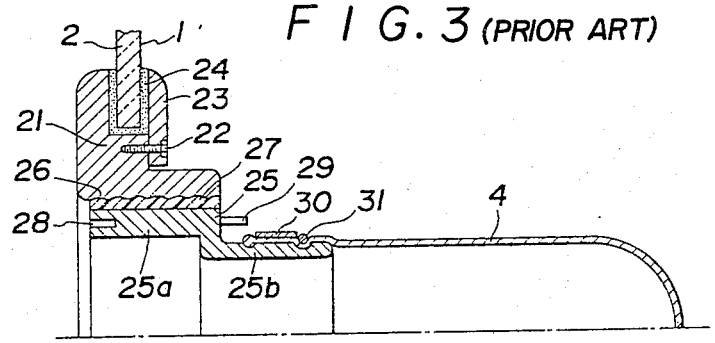
Figure 4:
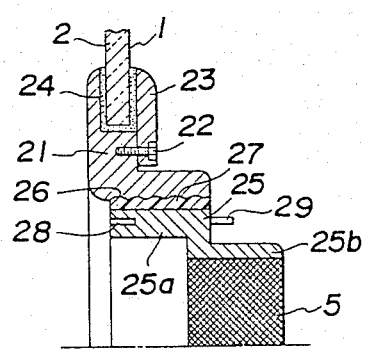
Figure 5:
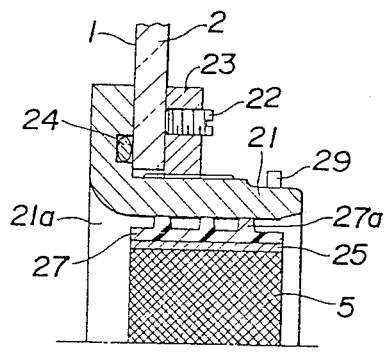
FIGS. 5-10 are longitudinal sectional views, each illustrating a respective preferred embodiment according to the present invention.

Referring to the drawings, the preferred embodiments of the present invention will be described below. FIG. 5 shows a replacement port section for the supply filter provided on a side wall 2 of a shielding box 1 in accordance with the present invention. A fixed port 21 has an opening 21a through which the shielding box 1 communicates with the outside thereof, and of which a smooth inner periphery constitutes a part of the fixed port 21. The fixed port 21 is secured to the wall 2 of the box 1 by means of a circular section of ring packing 24, bolts 22 and a fixing member 23. Alternatively, the fixed port 21 may be formed integrally with the wall 2. Likewise, the fixed port 21 may be secured to the wall 2 through a U-shaped section of ring packing instead of the circular section of the packing 24. A cylindrical air supply filter replacement port 25 having a filter 5 therein is fitted into the inner periphery of the fixed port 21 through an elastic member 27. Replacement port 25 comprises a rigid filter ring. A cylindrical replacement filter 5 comprising wound glass fiber fabrics is fixedly adhered to the inner wall of the replacement port 25. On the uniform outer periphery of the filter replacement port 25 is fixedly adhered cylindrical elastic member 27 made of polychloroprene rubber and having three spaced, ring-shaped projections 27a in its outer surface with epoxy or silicone rubber adhesives. The compressive deformation of the ring-shaped projections 27a provides a seal between the fixed port 21 and the filter replacement 25. Therefore, the outside diameter of the ring-shaped projections 27a is, of course, larger than the inside diameter of the fixed port 21.

In this case, the structure of the filter replacement port 25 is ring-shaped so as to prevent deformation of the filter 5 per se. However, if the filter 5 itself can prevent deformation, it may form the filter replacement port 25. The filter replacement port 25 is made of thermosetting resin, e.g. phenol resin, because it has good adhesiveness to polychloroprene rubber. However, the port 25 may be made of metallic material and, in particular, it is preferable to select such a material capable of minimizing and lightening waste matters thereof. Reference numeral 29 designates a pin provided on the outer periphery of the fixed port 21.

Figure 6:
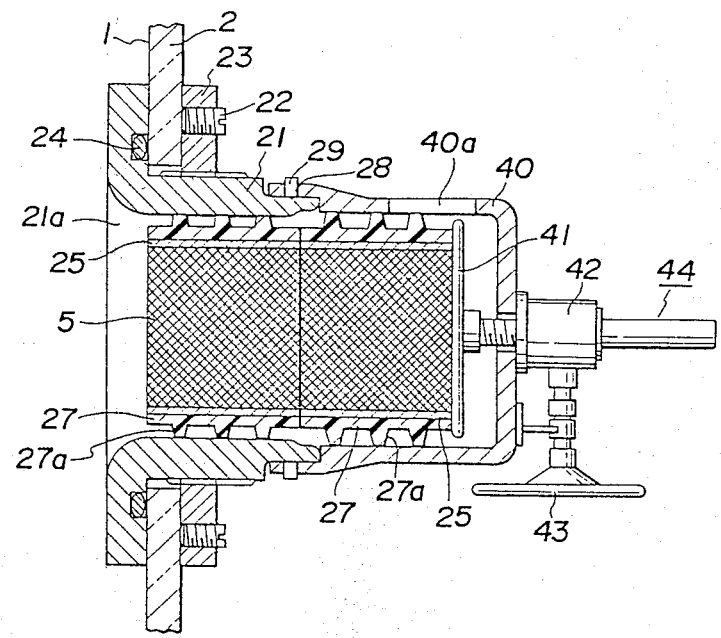

In operation of renewal of the filter 5 thus constructed at the replacement port 25 in the case of using an extruder or extruder type replacer 44 comprising a pin hole 28, a cylindrical portion 40, a disk 41, a reduction gear 42 and a handle 43, as shown in FIG. 6, first each pin 29 is fitted into the hole 28 to fix the extruder 44, then a new filter replacement port 25 pre-positioned within the cylindrical portion 40 and having the same structure as that of the old port 25 described above is moved forward to make the front face of the former port 25 contact with the rear face of the latter port 25 by rotating the handle 43 and advancing the disk 41. The handle 43 is rotated until the old port 25 is forced out of the fixed port 21 and falls into the shielding box 1 and the new port 25 is fixed to the inner periphery of the fixed port 21. Thus, the replacement or renewal of the filter port 25, and hence the filter 5 is completed.

During this replacement operation, the sealing between the fixed port 21 and the filter replacement port 25 is maintained perfect by the compressive deformation of the ring-shaped projections 27a. Therefore, the shielded materials will never leak out.

In this case, according to the frictional resistance between the ring-shaped projections 27a and the fixed port 21, it is preferred to coat the surface of the projections 27a with lubricant such as grease or the like. The use of the extruder type replacer 44 provides an advantage that an operator can carry out the renewal operation without direct contact with the filter replacement port 25. The cylindrical portion 40 of the extruder 44 has an eyehole 40a to confirm the normal movement of the filter replacement port 25.

Figure 7:
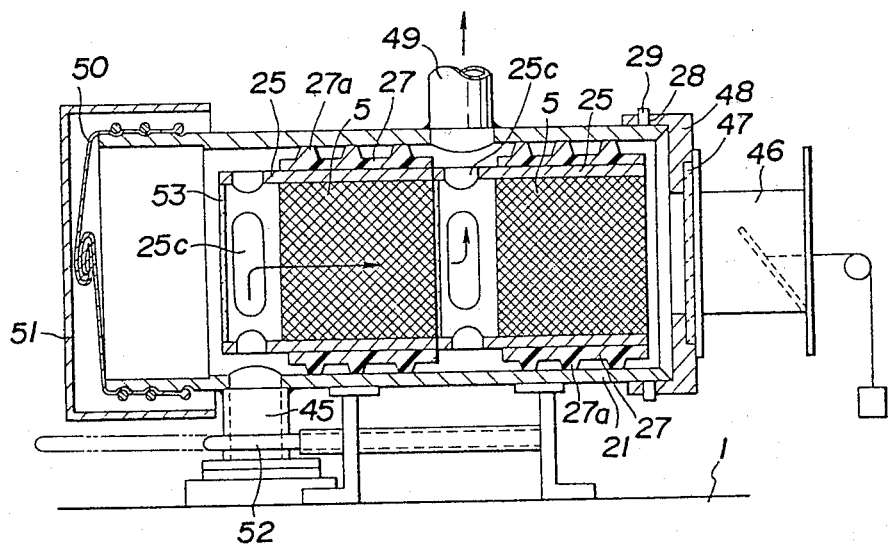

FIG. 7 shows another embodiment of the present invention wherein a replacement port section for an exhaust filter is mounted on the upper wall of the shielding box 1, a cylindrical fixed port 21 is provided in the exterior of the shielding box 1, and the filter replacement port 25 communicates with the interior of the box 1 through an exhaust duct 45 which forms a part of the fixed port 21. The fixed port 21 can accommodate plural filter replacement ports 25, one of which is disposed therein as a spare as shown on the right in FIG. 7. In the front end of the filter replacement port 25 are formed an appropriate number of slits 25c. In one end of the fixed port 21 is provided a pressure control damper 46 to maintain the negative pressure within the shielding box 1 constant. This damper 46 is secured to a cover 48 mounted on the fixed port 21 along with a filter 47. The gas stream purified by the filter 5 positioned in the port 25 is discharged from an exhaust duct 49 connected to the fixed port 21 through the slits 25c.

Renewal of the exhaust filter replacement port 25 is carried out in a manner similar to that in the embodiment of FIG. 6, but in this case the spent filter replacement port 25 pushed out is removed by a bag 50, a protective cover 51, a movable filter receiving device 52, which are provided in the opposite end of the fixed port 21. Accordingly, there is no necessity for cutting and removing the vinyl tubes connected to both ends of the filter case during each renewal of the filter, as in the conventional method.

Further, reference numeral 53 designates a bag receiver or supporter removably provided on the end face of the replacement port 25 for preventing the drop in filtering capacity of the filter 5 due to suction of the bag 50.

Figure 8:
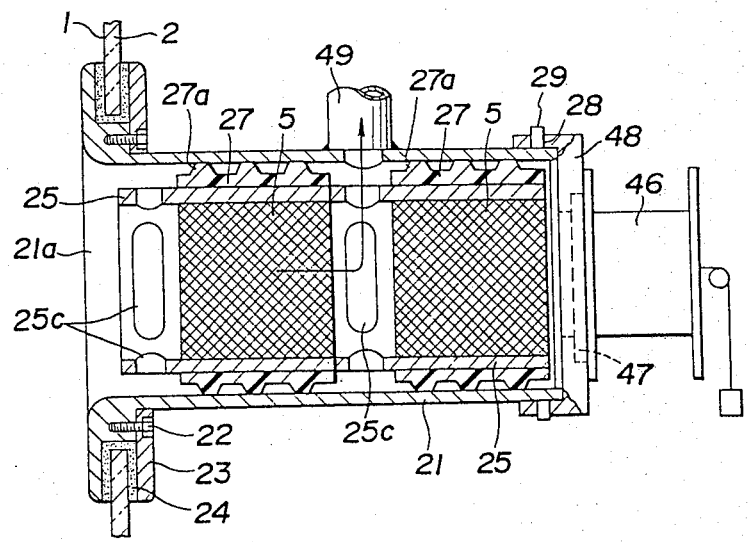

FIG. 8 shows still another preferred embodiment of the present invention wherein an exhaust filter replacement port 25 is provided in the side wall 2 of the shielding box 1. More particularly, a fixed port 21 has a construction similar to that shown in FIG. 5, but in this case the polluted air stream is directly sent from an opening 21a of the fixed port 21 through the filter replacement port 25 to an exhaust duct 49.

According to this construction, the spent filter replacement port 25 can be easily removed only by dropping it into the shielding box 1. Therefore, there is no necessity for using the bag 50, protective cover 51, filter receiver 52, as shown in FIG. 7.

Figure 9:
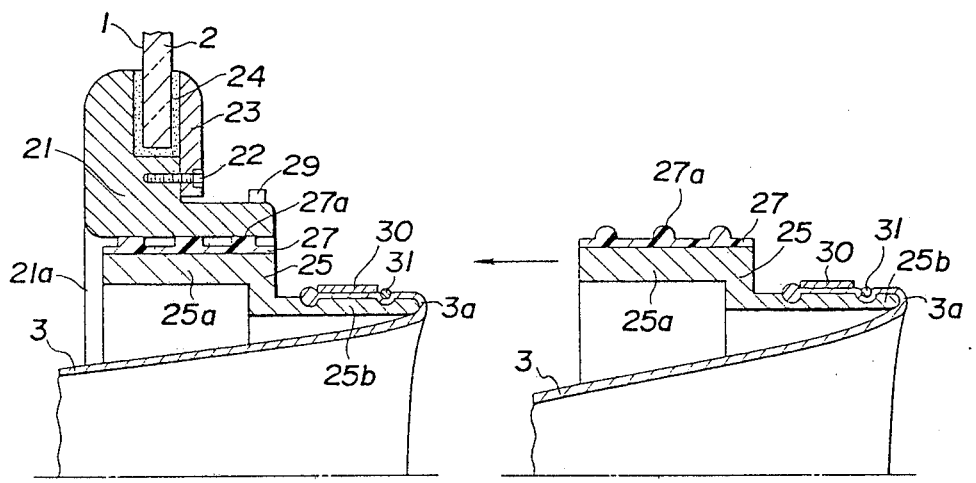

FIG. 9 illustrates another embodiment of the present invention wherein the main replacement members for the filter replacement port 25 are applied to a glove 3 and, in particular, a glove replacement port 25 is used instead of the air supply or exhaust filter replacement port 25 described above. As shown in FIG. 9, the glove replacement port 25 in the replacement port section comprises a cylinder having two cylindrical parts 25*a* and 25*b* different in diameter. To the outer periphery of the cylindrical part 25*a* is, in a manner similar to that of the glove described above, adhered a cylindrical elastic member 27 having ring-shaped projections 27*a* formed on the outer surface thereof. Over the outer periphery of the cylindrical part 25*b* smaller in diameter than the part 25*a*, is fixedly mounted the base 3*a* of the glove 3 by means of a ring-shaped tightening band 30, and O-ring 31. Renewal of the glove 3 in this case can be easily carried out by preparing a new glove replacement port 25 having the same construction as the old one, as shown on the right of FIG. 9, and utilizing the extruder type replacer (not shown). Accordingly, there is no necessity for using the bag utilized in the conventional method, and there is no danger that the polluted materials might leak out from the base 3*a* of the glove 3.

Figure 10:
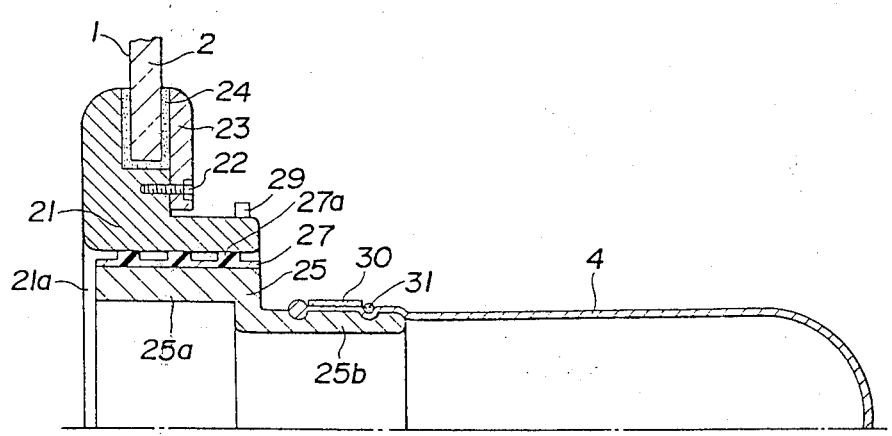

FIG. 10 illustrates still another preferred embodiment of the present invention wherein instead of the glove 3 described above, a bag 4 is provided on the replacement port 25 having the same construction as that of FIG. 9. The filter or glove replacement port 25 or the like dropped into the shielding box 1 can be easily and safely removed from the box 1.

In addition to a replacement such as the glove 3 or filter 5 described above, there is a cap adapted to be provided in a position of very low frequency of use for sealing the shielding box 1 from the outside. To this cap may be advantageously applied the replacement port 25 described above as a cap replacement port.

In the preferred embodiments of the present invention described above, a semi-circular section of ring-shaped projections are formed on the outer surface of a rubber body and such rubber body is fixedly adhered to the outer periphery of the filter, glove or bag replacement port. However, as shown in FIG. 11(*a*), ring-shaped projections 27*b* of triangular section may be formed alternatively with the ring-shaped projections 27*a* of semi-circular section on the outer surface of the rubber body 7 on the filter replacement port 25. Thus, even if the inner periphery of the fixed port has damaged portions, they may be filled up with the tops of the triangular projections, thereby improving the sealing performance.

Furthermore, as shown in FIGS. 11(*b*)-(*d*), a plurality of ring-shaped grooves 25*d* and/or 21*b* may be formed on the outer periphery of the filter replacement port 25 and/or the inner periphery of the fixed port 21, respectively, and in each of the grooves 25*d* and 21*b* may be positioned an elastic ring 27*a* or 27*c* in the place of the ring-shaped projections described above. Thus, this construction can eliminate the cylindrical rubber portion and hence, is economical. In these embodiments, the semi-circular, triangular, or square section of ring-shaped projections have been indicated, but the present invention is not intended to be limited to such sectional shape.

As described above, renewal of the replacements such as the filter, glove, or bag can be efficiently, surely and safely carried out only by pushing the new replacement port into the shielding box due to the simple construction thereof according to the present invention. During this renewal operation, the sealing performance between both ports can be maintained perfect owing to the compressively deformed state of the ring-shaped projections. In addition, there is no necessity for screwing the replacement port into the shielding box, as in a conventional manner, and hence no rotational torque is required to screw the replacement port therein. Thus, the present invention is of great industrial value.

As described above, the structure of the port section for mounting a replacement such as a filter, glove, bag or the like on the shielding box according to the present invention can safely and easily carry out renewal of the replacement when such a replacement becomes unserviceable. Therefore, it is very advantageous to utilize the structure of the present invention with a box or container in which various materials to be shielded are arranged and which such materials must be handled or manipulated from the outside thereof.

What is claimed is:

1. A port structure for use on a shielding box to support a replacement port and to enable sealed replacement thereof, said port structure comprising:

a fixed port member having a duct operable to be fixedly sealingly connected to the interior of a shielding box and an exhaust duct connected to the atmosphere, said fixed member having a smooth inner surface defining an elongated passage;

a plurality of replacement port members positioned axially serially within said passage within said fixed port member;

each said replacement port member having a uniform outer surface having firmly fixed thereto an elastic member having extending therefrom a plurality of axially spaced elastic ring members sealingly contacting said smooth inner surface of said fixed port member;

each said replacement port member including an internal portion receiving therein a filter member and a portion having therein at least one slit;

said plurality of replacement port members being positioned within said fixed port member such that during use of the shielding box, air from the shielding box passes through said duct of said fixed port member and said slit in one replacement port member, through said filter member in said one replacement port member to be purified thereby, and through said slit in the said replacement port member next adjacent said one replacement port member and said exhaust duct of said fixed port member;

flexible bag means provided on a first end of said fixed port member for receiving said one replacement port member, upon replacement thereof in said use position by said next adjacent replacement port member, upon axial sliding movement being imparted to said plurality of replacement port members in a direction from a second end of said fixed port member toward said first end thereof; and pressure control damper means provided at said second end of said fixed port member for maintaining the internal pressure within the shielding box within a predetermined pressure range.

2. A structure as claimed in claim 1, wherein said axially spaced elastic ring members are integral with the respective said elastic member.

3. A structure as claimed in claim 2, wherein said ring members have a semi-circular section.

4. A structure as claimed in claim 2, wherein alternate of said ring members have a semi-circular section and a triangular section.

* * * * *

UNITED STATES PATENT AND TRADEMARK OFFICE
CERTIFICATE OF CORRECTION

PATENT NO. : 4,427,894
DATED : January 24, 1984
INVENTOR(S) : Mitsugu SUNAOSHI et al.

It is certified that error appears in the above-identified patent and that said Letters Patent is hereby corrected as shown below:

In Section [73] Assignee:, add --and Doryokuro Kakunenryo Kaihatsu Jigyodan, Tokyo, Japan--

Signed and Sealed this

Twentieth Day of January, 1987

Attest:

DONALD J. QUIGG

Attesting Officer     Commissioner of Patents and Trademarks